United States Patent [19]

Howell et al.

[11] 4,284,973
[45] Aug. 18, 1981

[54] VEHICLE ALARM SYSTEM

[76] Inventors: Steven G. Howell, Dogwood La., Oakwood Estate, Wake Forest, N.C. 27587; Orville F. Harless, 2506 Briarwood Dr., Burlington, N.C. 27215

[21] Appl. No.: 77,398

[22] Filed: Sep. 20, 1979

Related U.S. Application Data

[63] Continuation-in-part of Ser. No. 888,844, Mar. 22, 1978, Pat. No. 4,187,497.

[51] Int. Cl.$^3$ .............................................. B60R 25/10
[52] U.S. Cl. ..................................... 340/65; 340/539; 200/61.45 R
[58] Field of Search .......................... 340/65, 539, 566; 200/61.45 R, 61.52

[56] References Cited

U.S. PATENT DOCUMENTS 4,155,067  5/1979  Gleeson .................................. 340/65

*Primary Examiner*—Alvin H. Waring
*Attorney, Agent, or Firm*—Mills & Coats

[57] ABSTRACT

A portable vehicle alarm system having a motion sensitive switch and a transmitter for transmitting an alarm to a remote receiver. The receiver is capable of several functions including silent alarm to police or security guards as well as visual and audible alarms in remote locations such as light poles and roof tops of buildings. The alarm also includes a key set function with indicator lights for the motion switch and trip/transmit status.

10 Claims, 8 Drawing Figures

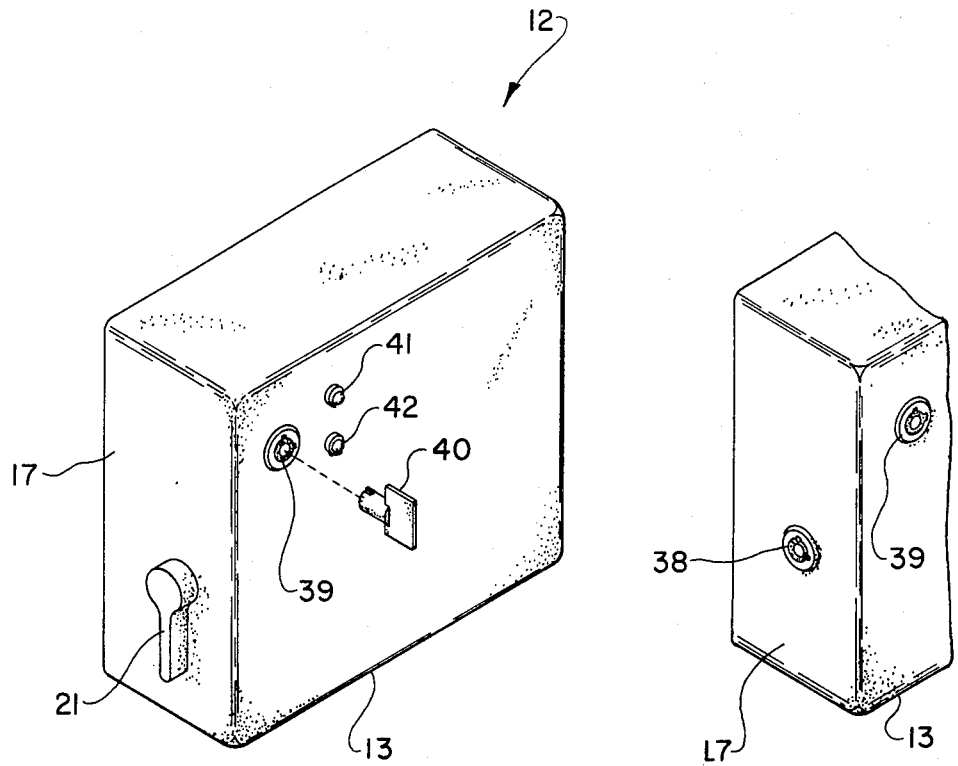
FIG. 1
FIG. 2
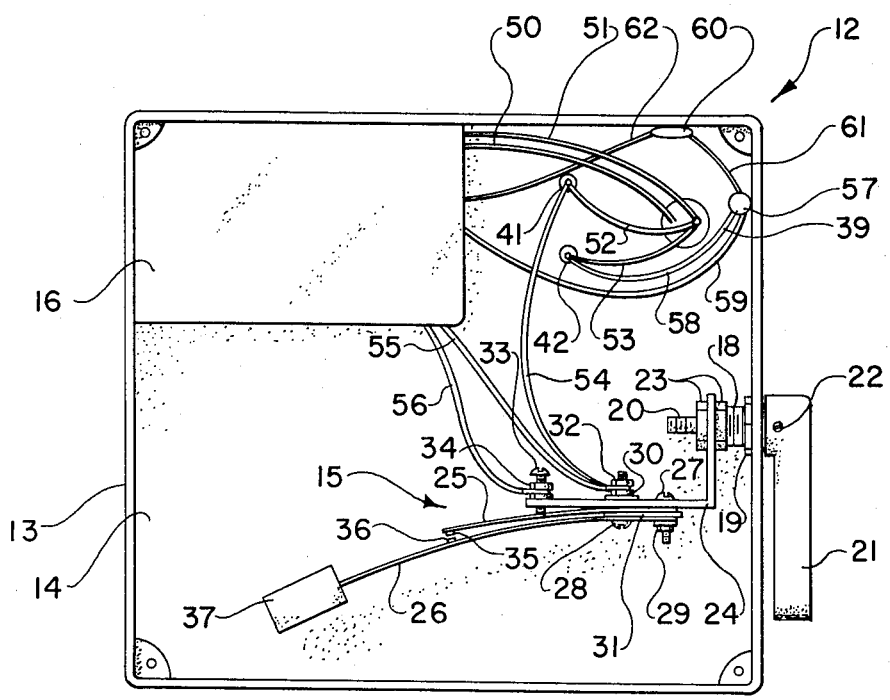
FIG. 3

VEHICLE ALARM SYSTEM

This is a continuation-in-part of U.S. patent application Ser. No. 888,844, now U.S. Pat. No. 4,187,497, filed Mar. 22, 1978, by Steven G. Howell and Orville F. Harless, inventors, entitled "Portable Vehicle Alarm."

BACKGROUND OF THE INVENTION

This invention relates to alarm systems and more particularly to portable vehicle alarms with remote signal capabilities.

In the past various types of vehicle alarm systems have been devised. Some of these devices have even included motion sensing means which, when the vehicle is tampered with, will close a circuit setting off the alarm. These motion sensitive devices have almost invariably, however, been permanently installed in the vehicle and require a considerable amount of time and labor thus being far from portable.

Organizations such as new and used automobile and truck sales lots have had a particular problem in that they want their vehicles to be readily accessible to the public even at odd hours when no sales personnel are available. On the other hand, new and used cars on an open, unprotected lot after business hours are an open invitation to vandals and hub cap snatchers as well as auto thefts. Up to now no satisfactory method of protection has been available since it is impractical to install a permanent alarm system which may or may not be heard by authorities on a car that may only stay on the lot a few days. On the other hand, if the lot is enclosed, it can (1) still be entered and (2) will in all probability cause loss sales by prospective customers not being able to inspect or window shop the vehicles.

Another alternative is, of course, to have a full-time guard posted but the cost of this is in most cases prohibitive and thus is considered an impractical alternative.

SUMMARY OF INVENTION

After much research and study into the above-mentioned problems, the present invention has been developed to provide a portable vehicle alarm system which is not aesthetically detracting from the vehicle, is independent of the vehicle electrical system, is easy to install and remove, and is capable of remotely setting off either a silent alarm or a visual or audible alarm. This improved alarm system is compact in structure, cannot be shut off without being set off, and has provisions to indicate that it has transmitted an alarm so that the same can be quickly and readily reset.

In view of the above, it is an object of the present invention to provide a portable alarm system which is compact in structure and is readily attachable and detachable from a vehicle.

Another object of the present invention is to provide a portable vehicle alarm system which will not be activated to operative status until a key switch is turned on.

Another object of the present invention is to provide a portable vehicle type alarm system with a sensitive motion sensing switch incorporated into the alarm circuit thereof.

Another object of the present invention is to provide, in a portable alarm system, a motion switch condition indicator.

Another object of the present invention is to provide an indicia which will remain in signal condition once the alarm is set off until the same is reset.

Another object of the present invention is to provide a portable vehicle type alarm system which fits on the window of the vehicle and includes a leveling means for its integral motion switch.

Another object of the present invention is to provide a portable vehicle type alarm system which will transmit a silent alarm to law enforcement personnel.

Another object of the present invention is to provide in a portable vehicle type alarm system transmitter means for remotely triggering alarm signals.

Other objects and advantages of the present invention will become apparent and obvious from a study of the following description and the accompanying drawings which are merely illustrative of such invention.

BRIEF DESCRIPTION OF THE DRAWINGS

FIG. 1 is a front perspective view of the housing for the portable alarm system of the present invention;

FIG. 2 is a fragmentary perspective view of the modification of the housing shown in FIG. 1;

FIG. 3 is a rear elevational view of the vehicle attached portion of the system of the present invention with the back removed;

DETAILED DESCRIPTION OF INVENTION

Figure 4:
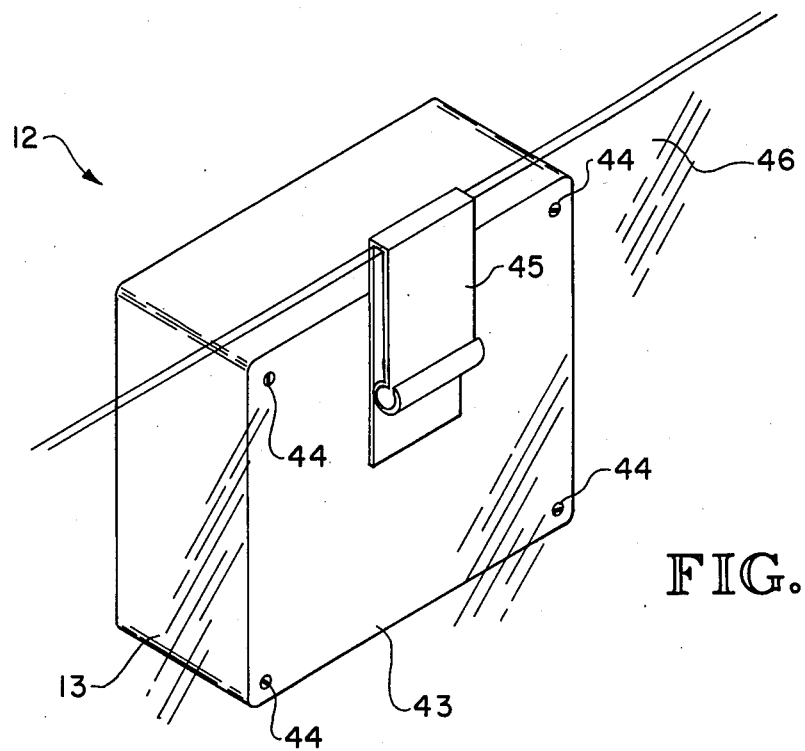
FIG. 4 is a rear perspective view of the vehicle portion of the alarm system of the present invention showing the same attached to a window of a vehicle.

With further reference to the drawings, the overall alarm system of the present invention is broken down into two main components, namely, the usually fixed receiver component indicated generally at 11 and the usually mobile, transmitter component indicated generally at 12.

Referring more specifically to the transmitter component of the alarm system of the present invention, a housing 13 is provided which is open on one side to provide access to the interior 14 thereof. Within interior 14 is disposed a motion sensitive switch indicated generally at 15 and a transmitter and power supply contained within housing 16.

Transmitter component housing 13 is preferably constructed of a nonelectrical conducting material such as Bakelite. Passing through side 17 of housing 13 is a sleeve or collar 18 which is held in relative fixed position by means such as nut 19. A threaded shaft 20 is adapted to be received by sleeve 18 and passed therethrough with one end of such shaft being fixedly secured to leveling handle 21 by means such as set screw 22. To the end of shaft 20 opposite leveling handle 21 are a pair of nuts 23 which, when tightened down, fixedly secure L-shaped bracket 24 to shaft 20 as can clearly be seen in FIG. 3.

A pair of leaf arms 25 and 26 constructed from spring type metal are provided and are secured to bracket 24 by means such as bolts 27 and 28 and respective hold down nuts 29 and 30. An insulating spacer 31 is provided between the two leaf arms 25 and 26 and bolt 28 is insulated from the leaf arm as it passes therethrough. Bolt 28 on the other hand is in electrical contact with leaf arm 26 but is insulated from arm 25 and bracket 24. Nut 32 on bolt 28 forms the same into an electrical terminal as can clearly be seen in FIG. 3. A third bolt 33 is threadingly disposed through bracket 24 and is used to adjust the sensitivity of motion sensing switch 15 by adjusting the position of leaf arm 25 as again can be seen clearly in FIG. 3. The upper portion of bolt 33, through use of nut 34, forms an electrical terminal for the electrical circuit which will hereinafter be described.

Electrical contact points 35 and 36 are provided adjacent each other on leaf arms 25 and 26, respectively. Weight 37 is fixedly secured to the outer end of leaf arm 26 so that any movement of housing 13 will cause weight 37 to oscillate thereby closing contacts 35 and 36.

From the above, it can be seen that bracket 24 can be rotated parallel to the longitudinal axis of shaft 20 by turning handle 21 either clockwise or counterclockwise. Thus if housing 13 is disposed at an angle such as being mounted on the inclined window of certain modern cars, handle 13 can be manipulated to a vertical position thus disposing bracket 24 with its electrical leaf arms 25 and 26 one above the other for proper operation of the weighted motion sensitive switch again indicated generally at 15.

Although other types of motion sensing switches could be substituted for that shown at 15, this type of weighted switch has been found to operate very satisfactorily in the units produced by the Inventors as having enough sensitivity while at the same time dampening down relatively quickly for alarm set purposes.

A key operated switch 38, as shown in FIG. 2, could be substituted for handle 21 as a leveling means for motion sensing portion 15 of the present invention. This would have two purposes; first, it would make the unit of the present invention even more tamperproof and secondly, it would eliminate the outwardly protruding handle which is subject to damage over a period of time.

In addition to sensor 15 being mounted within housing 13 as described above, a key switch 39 is provided which is a stock, commercially available item and is nothing more than an off-on switch which is activated or turned on and off by a special key 40. This is the same type key which, of course, can be used to operate key handle 38 should this be decided upon rather than leveling handle 21.

A yellow light emitting diode or LED 41 is provided in housing 13 as is red LED 42. The operation of both of these last two mentioned lights will, of course, hereinafter be described in more detail.

Housing 13 includes a back 43 which is removably held in place by means such as screws 44. A window engaging bracket 45 constructed of stainless steel or other suitable material is fixedly secured to back 43 by any suitable means (not shown). Once the housing 13 is mounted over a window 46 of a vehicle 47 and such window is rolled up into its closed position, the screws 44 holding back 43 in place are protected from unauthorized tampering by bracket 45 holding the same slightly against window 46. Any attempt to move housing 13 will, of course, set switch 15 in motion which will activate the alarm as set forth below.

Figure 7:
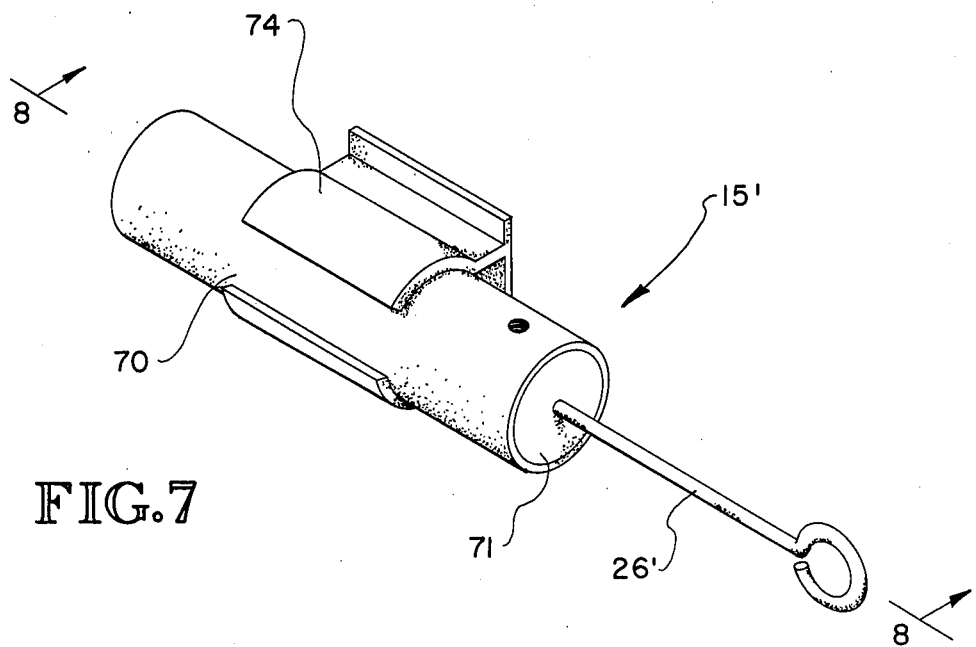
FIG. 7 is a perspective view of a modified motion sensitive switch.
Figure 8:
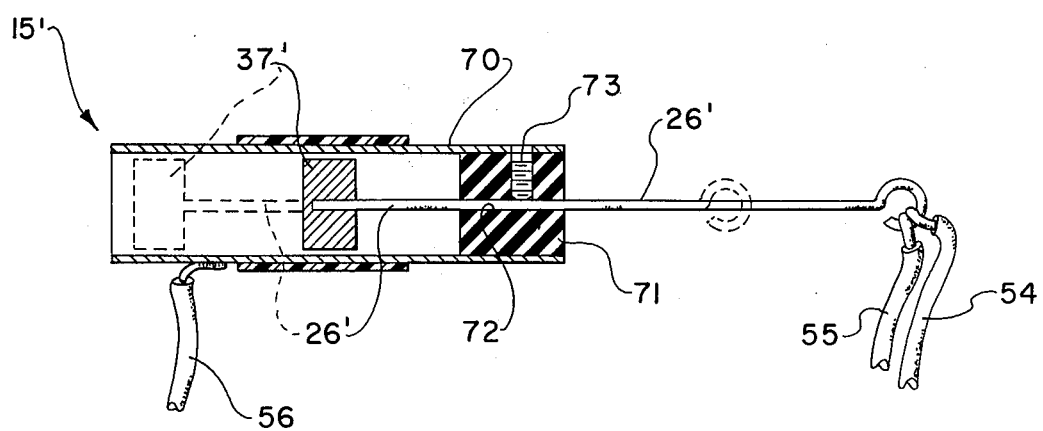
FIG. 8 is a sectional view of such modified switch taken through lines 8—8 of FIG. 7.

A modified motion sensing switch indicated generally at 15' is disclosed in FIGS. 7 and 8. In this embodiment, the activating weight is indicated at 37' with spring arm 26' supporting such weight.

The function of the weight and spring arm are the same as hereinabove described for weight 37 and arm 26.

In this particular embodiment, contacts such as those indicated at 35 and 36 in FIG. 3 are replaced by the weight 37' itself acting as one contact and the generally cylindrical shaped metallic shroud 70 acting as the other contact.

An insert or plug 71 is provided in one end of cylindrical shroud 70. This insert is preferably fixed secured relative to the shroud and is constructed of a nonconductive material.

An axial opening 72 is provided in insert 71 and is adapted to slidingly receive spring arm 26'. A set screw 73 or other suitable securing means is provided so that once the proper axial location of weight 37' within shroud 70 is determined, spring 26' can be secured against axial movement within opening 72.

The end of spring arm 26' opposite sensing weight 37' is adapted to have leads 54 and 55 secured thereto. These leads or lines act in the same manner as hereinabove described for motion sensing switch 15 and further description of the same is not deemed necessary.

Likewise, lead 56 is secured by solder or other suitable means to metallic shroud 70 and functions in the same manner as in conjunction with switch 15.

A mounting bracket 74, constructed from plastic or other suitable nonconductive material, is provided for securing switch 15' within the interior 14 of housing 13.

From the cross section of FIG. 8, it can be readily understood that as weight 37' is moved outwardly away from insert 71, the unsupported length of spring arm 26' is increased thus increasing the sensitivity of such weight to movement. In other words, the longer the spring arm, the more sensitive the weight on the end thereof becomes.

To adjust the sensitivity of the embodiment shown in FIGS. 7 and 8, the set screw 73 is simply loosened and spring arm 26 moved axially inwardly or outwardly until the desired sensitivity is reached whereupon such set screw is tightened, locking spring arm 26' relative to insert 71.

Because shroud or housing 70 is cylindrical in shape and weight 37' is circular in end plan view, so long as the motion sensing switch 15' is generally horizontally disposed, it can be rotated 360 degrees without in any way effecting its sensitivity. The advantage of this, of course, is the elimination of the leveling procedure required by movement of handle 21 in the embodiment heretofore described. This elimination of the leveling procedure of the motion sensitivity switch not only greatly shortens the installation time of the unit of the present invention on the object to be protected, but it also allows great reduction in the size of the overall unit 12. Using micro circuitry, a housing no larger than a pack of cigarettes can be produced with the sensitivity and all other features of the first described embodiment being retained. The advantage of this, of course, is obvious from not only a production standpoint, but also from storage, shipping and aesthetic points of view.

Although the modified motion sensing switch 15' has hereinabove been described as being disposed on a generally horizontal axis, the same obviously would work on any inclination between horizontal and vertical. The sensitivity would, of course, be somewhat changed with the near vertical axial alignment giving weight 37' a pendulum effect on spring arm 26' for the least sensitive function for any given length of spring arm. In some applications, it may be desirable to have less sensitivity and the weighted pendulum position would certainly in this case be more desirable than the weighted spring arm positioned.

Figure 5:
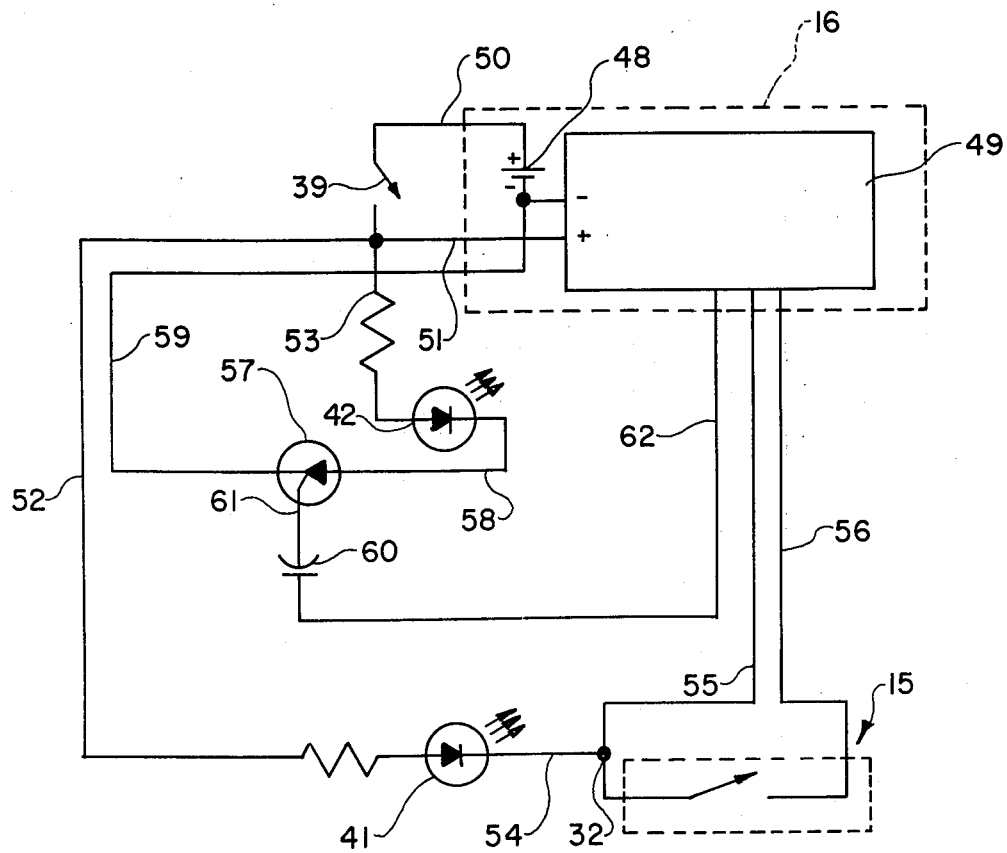
FIG. 5 is a schematic of the vehicle portion of the present invention.

Modified switch 15' is, of course, connected into the circuitry shown in FIG. 5 of the alarm system with lines 54 and 55 being conductively connected to metallic cylinder 70 as described above.

Referring more specifically to the schematic of FIG. 5 of the drawings and correlating this with FIG. 3 showing the physical embodiments of the same, housing 16 encloses a power supply 48 and a transmitter 49. The power supply 48 can, of course, be in the form of a battery such as the commonly available nine-volt transistor battery.

The transmitter can be any one of a number of types of commercially available. The Linear Model 26 Delayed Transmitter produced by the Linear Corporation, Inglewood, Calif., has been found very satisfactory for use in conjunction with the disclosure of the present invention.

Connecting one side of power supply 48 to key switch 39 is line 50. There are three lines leaving the other side of switch 39, namely, line 51, operatively connected to transmitter 49, line 52 to yellow LED 41, and line 53 to red LED 42.

Yellow LED 41 is connected to terminal 32 of motion sensing switch 15 by line 54. Line 55 is also connected to terminal 32 and leads to transmitter 49 and the trip portion thereof.

The opposite side of motion switch 15 leading from terminal 34 to the trip section of transmitter 49, is line 56.

Red LED 42 is connected to silicon controlled rectifier or SCR 57 by line 58. The SCR 57 is then in turn connected to the power supply by means such as line 59.

Between the gate of SCR 57 and capacitor 60 is connected line 61. The other side of capacitor 60 is connected to the voltage side of transmitter 49 by line 62.

OPERATION OF INVENTION

To use the portable vehicle alarm system of the present invention, the receiver component 11 of the system is installed at any desired remote location.

This receiver component 11 is operatively connected to desired alarm means such as a siren 66 or other audible alarm, visual alarm such as lights 67, or to remote silent alarms carried over transmission lines 68 to remote locations such as a police station or guard house (not shown).

Figure 6:
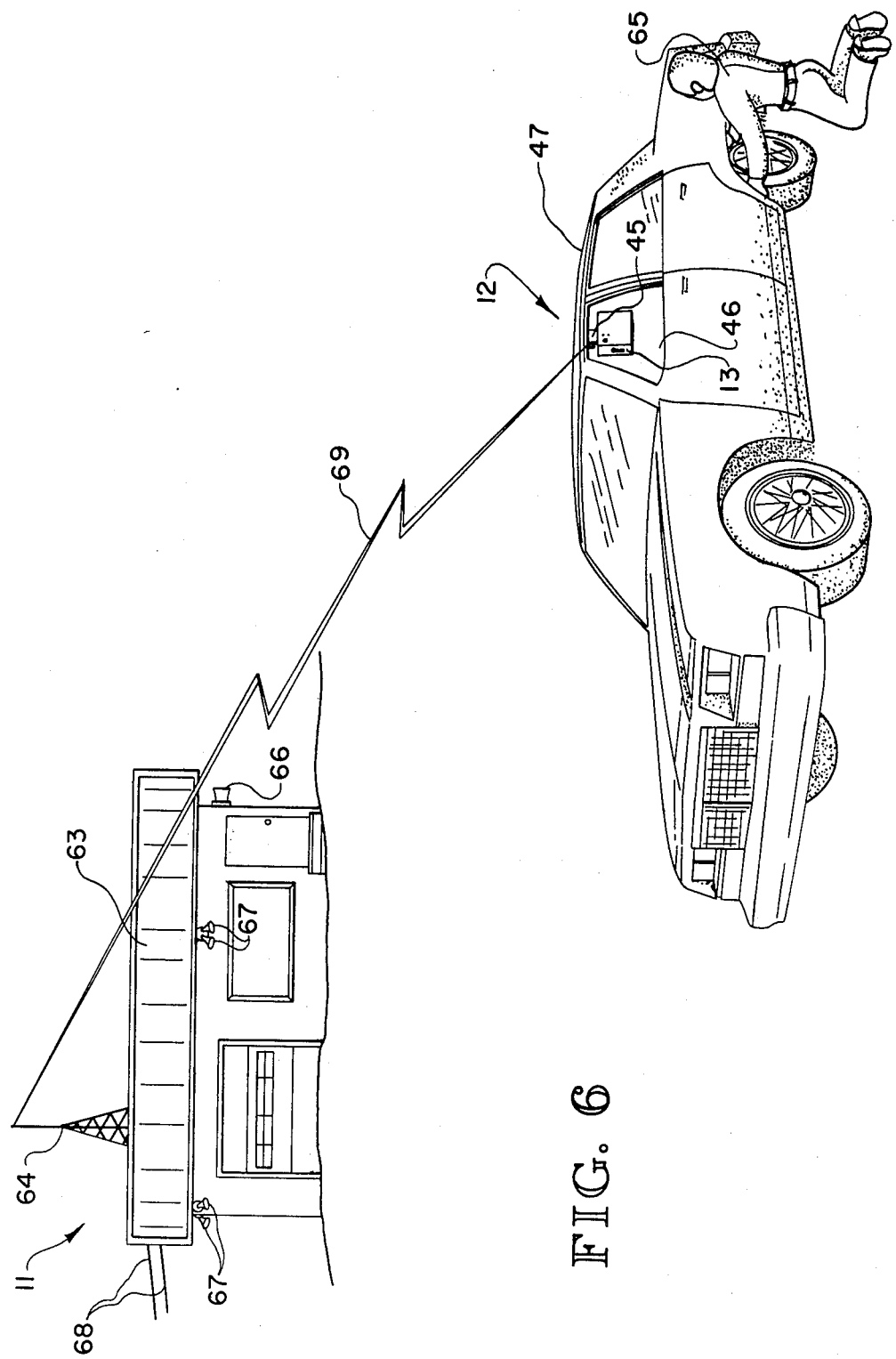
FIG. 6 is a perspective view of the alarm system of the present invention in actual use.

The transmitter component 12 is secured to the window 46 of vehicle 47 by slipping bracket 45 over the top edge of such window and rolling the window up into the closed position as seen clearly in FIG. 6.

Once the transmitter component 12 has been properly installed on the vehicle 47 or other unit to be protected, then handle 21 or key handle 38 can be used to dispose the motion sensitive means 15 for proper operation. This, in the case of the weighted spring switch disclosed in FIG. 3, would be vertical orientatation of handle 21 to dispose leaf arms 25 and 26 horizontally. If the motion sensing means 15 is not disposed correctly, it will, of course, either be too sensitive or not sensitive enough because of the angular differential between its actual disposition and its optimum operative disposition.

Switch 39 can then be turned on by key 40 and the same removed. Should the motion sensitive means or switch 15 be disturbed during the turning on of switch 39 or still be in motion enough to make periodic contact between points 35 and 36, current will flow from power source 48 through switch 39 by way of line 52 to illuminate yellow LED 41 prior to return to the power source through line 56. Since the type transmitter 49 hereinabove described is of the time delay type, from the time closure is made between trip lines 55 and 56 until actual transmission (shown graphically at 69) occurs is approximately five seconds. During this time the person setting up the alarm will note that LED 41 is flashing each time contact is made between the points of the motion sensor 15 and will be able to open switch 39 to prevent activation of the alarm. Once the motion sensor has settled down so that no contact is being made between the points of the motion sensor, then switch 39 can again be closed to arm the transmitter component 12. Thereafter the person setting up the alarm can very gingerly remove key 40 from switch 39 and leave the vehicle 47.

Should the vehicle (or other unit being protected) 47 be tampered with, such as if someone is trying to break into the car, start the same or simply vandalizing by the person illustrated at 65 in FIG. 6, enough motion will be transmitted to housing 13 to cause weight 37 to move up and down thereby closing the contacts of motion switch 15. Once these contacts close, current will flow from power source 48, through switch 39, at line 52, through switch 15, and by line 56 to transmitter 49. After the five second delay mentioned above, transmitter 49 will transmit the alarm signal 69. When this signal is transmitted, voltage will be applied to line 62 which, by way of capacitor 60 and line 61, to the gate of SCR 57 thereby allowing current to flow therethrough and locking the same in closed condition thus allowing current to flow from switch 39 through line 53 to red LED 42. The circuit is, of course, closed through lines 58 and 59 and back to the power source. Until such time as key switch 39 is opened, red light will be emitted continuously from LED 42.

The transmitted signal 69 from transmitter component 12 will be received by receiver component 11 through receiver antenna 64. Alarms such as sirens, horns, lights, etc., connected to component 11 will then go off thus attracting attention to culprit 65. Should it be so desired, a silent alarm can be transmitted to a remote location such as a guard house or police station by means such as telephone lines 68.

The system of the present invention is readily adaptable to multi-transmitter installations such as all of the cars on an automobile sales lot. The red light emitting diode 42 becomes locked in by the gate of silicon controlled rectifier 57 when the transmitter 12 has been set off. Thus all the person in charge has to do is walk around looking at the boxes mounted on the windows of the various vehicles until he finds the one with the red light on and he can simply take his key 40 and turn switch 39 off which immediately not only turns transmitter 49 off but also the entire transmitter portion 12. Switch 39 can then immediately be turned back on and the transmitter alarm will once again be armed and ready to transmit the alarm whenever motion sensing means 15 is again disturbed.

Whenever the car 47 or other unit on which the transmitter portion 12 of the present invention is mounted is desired to be driven or otherwise used, key switch 39 is opened, the window 46 rolled down and clip 45 on the back 43 of housing 13 removed from such window. The vehicle is then immediately available for use with no evidence of the alarm ever having been used thereon.

From the above, it can be seen that the present invention has the advantage of providing an extremely effective alarm system which can be readily transferred from one vehicle or unit to another. It also is uncomplicated to operate and yet cannot be tampered with without the alarm being activated. The relative simplicity of the components of the present invention allows it to be inexpensively manufactured thus aiding in widespread commercial acceptability.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An alarm system comprising: a remote receiver component, alarm means operatively connected to said receiver component; a portable transmitter component; trip means operatively connected to said transmitter component whereby when said trip means is closed an alarm signal will be sent from said transmitter component to said receiver component; and an adjustable motion sensitive closure means in the form of a generally horizontally disposed, cylindrical shaped shroud means, at least a part of which is electrically conductive, with a weight means horizontally disposed interiorly thereof supported by a spring arm means operatively connected to said trip means, the length of said spring arm being longitudinally adjustable to adjust the sensitivity of said weight means relative to said cylindrical shroud whereby when said transmitter component is disturbed, the system of the present invention will emit an alarm.

2. The system of claim 1 wherein a visual transmit indicator means is provided.

3. The system of claim 2 wherein the transmit indicator is a light emitting diode.

4. The system of claim 1 wherein an indicator means is provided when the motion sensing means is in unstable condition.

5. The system of claim 4 wherein the indicator means is a light emitting diode.

6. The system of claim 1 wherein alignment means is provided for said motion sensing means whereby optimum disposition of the same can be obtained regardless of the disposition of the remainder of the transmitter component.

7. The system of claim 1 wherein a key operated switch is used for turning the transmitter component on and off.

8. The system of claim 7 wherein a time delay means is provided in the off-on circuit whereby the transmitter component can be cut off within a certain length of time if the motion sensing means is in an unstable condition.

9. The system of claim 8 wherein the time delay period is approximately five seconds.

10. The system of claim 1 wherein the transmitter component is removably mounted over the upper edge of an openable vehicle side window.

* * * * *